(12) United States Patent  (10) Patent No.: US 8,031,085 B1
Anderson  (45) Date of Patent: Oct. 4, 2011

(54) CONTEXT-BASED SOUND GENERATION (75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 13 days.

(21) Appl. No.: 12/761,022

(22) Filed: Apr. 15, 2010

(51) Int. Cl.
G08G 1/123 (2006.01)

(52) U.S. Cl. ........ 340/988; 340/901; 340/435; 340/436; 340/686.6; 340/425.5

(58) Field of Classification Search .......... 340/901–903, 340/988, 425.5, 435, 436, 686.6, 500, 539.1, 340/539.13, 539.11, 825.49; 701/22, 207
See application file for complete search history.

(56) References Cited

U.S. PATENT DOCUMENTS

| | | | |
|---|---|---|---|
| 6,552,661 B1 * | 4/2003 | Lastinger et al. .......... | 340/572.1 |
| 6,650,242 B2 * | 11/2003 | Clerk et al. ................ | 340/573.1 |
| 6,917,300 B2 * | 7/2005 | Allen .......................... | 340/686.6 |
| 7,222,004 B2 | 5/2007 | Anderson | |
| 7,330,117 B2 * | 2/2008 | Ferguson et al. .......... | 340/572.1 |
| 7,852,233 B2 * | 12/2010 | Cemper ........................ | 340/901 |
| 2010/0063626 A1 | 3/2010 | Anderson | |
| 2010/0063648 A1 | 3/2010 | Anderson | |
| 2010/0063651 A1 | 3/2010 | Anderson | |
| 2010/0063652 A1 | 3/2010 | Anderson | |
| 2010/0063663 A1 | 3/2010 | Tolstedt et al. | |
| 2010/0063664 A1 | 3/2010 | Anderson | |
| 2010/0063672 A1 | 3/2010 | Anderson | |
| 2010/0063673 A1 | 3/2010 | Anderson | |
| 2010/0063680 A1 | 3/2010 | Tolstedt et al. | |
| 2010/0063954 A1 | 3/2010 | Anderson | |

* cited by examiner

*Primary Examiner* — Anh V La
(74) *Attorney, Agent, or Firm* — Yee & Associates, P.C.; Marilyn Smith Dawkins (57) ABSTRACT

A method for directing a vehicle to operate in a noise generating mode based on a context is provided. A present location of the vehicle is determined using a location sensing device. Then, it is determined whether the present location of the vehicle is within one or more noise generating zones. In response to determining that the present location of the vehicle is within a noise generating zone, the vehicle is directed to operate in the noise generating mode.

34 Claims, 6 Drawing Sheets

CONTEXT-BASED SOUND GENERATION

FIELD OF THE INVENTION

The present invention relates generally to context-based sound generation and more particularly to a method and system for generating a noise by a vehicle above a minimum threshold level based on a context.

BACKGROUND OF THE INVENTION

Today, vehicles such as hybrid vehicles are powered by an internal combustion engine and one or more electric motors. The internal combustion engine produces noise from the ignition and combustion of fuel, among other things. Although a muffler may reduce the level of noise emanating from an exhaust system of the hybrid vehicles, typically even this reduced level of noise may be heard by individuals along roadways. However, when hybrid vehicles operate using only the one or more electric motors, the level of noise emanating from these hybrid vehicles may be imperceptible to individuals along the roadways.

SUMMARY

An embodiment of the present invention provides a method and system for directing a vehicle to operate in a noise generating mode based on a context. A present location of the vehicle is determined using a location sensing device. Then, it is determined whether the present location of the vehicle is within one or more noise generating zones. In response to determining that the present location of the vehicle is within a noise generating zone, the vehicle is directed to operate in the noise generating mode.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Illustrative embodiments of the present invention provide methods and systems for operating a vehicle in a noise generating mode of operation based on recognition of a context. A vehicle may, for example, be a combustion engine vehicle, a hybrid combustion engine/electric motor vehicle, an electric motor vehicle, a bio-motor vehicle, such as a bicycle, or any other type of motor vehicle. A context is the surrounding circumstances or events that form the environment within which illustrative embodiments place a vehicle in a noise generating mode of operation to alert individuals, such as, for example, visually impaired individuals, in close proximity of the vehicle of the vehicle's presence.

One example of a context may be visually impaired individuals wanting to cross a street in a crosswalk where a hybrid combustion engine/electric motor vehicle may be operating in a quiet mode (i.e., using only the electric motor for locomotion). Another example of a context may be individuals working in close proximity with one or more autonomous robotic vehicles in a structured worksite, such as a construction site or a grain field. A structured worksite is a worksite where only authorized individuals, such as workers, are permitted to be present. An unstructured site may, for example, be a yard surrounding a house where a robotic service mower may be in operation cutting grass when one or more individuals appear unexpectedly in the yard. An individual may be a person, an animal, or a machine.

It should be noted that illustrative embodiments are not limited to the two above-listed exemplary contexts. Illustrative embodiments may be utilized in any number of different contexts.

Illustrative embodiments consist of a context recognition component, which actuates a sound generating component. In one illustrative embodiment, the context recognition component is a map of an area that includes one or more zones showing where a particular sound should be generated by a vehicle. It should be noted that different zones in an area may have different sounds associated with them.

An area may, for example, be a country, region, state, county, metropolitan area, city, town, subdivision, or neighborhood. A zone may, for example, be one or more blocks on a street or a plurality of streets in the area. A street includes a highway, interstate, alley, driveway, or any other type of vehicle pathway. In addition, a zone may include open fields, lawns, or other spaces that do not include a designated vehicle pathway.

An example of a zone may be a block on a particular street that has a home for the visually impaired with crosswalks often used by these visually impaired individuals living at the home. When a vehicle, such as a hybrid vehicle, enters this zone comprising this particular block, which may be detected by a geo-position sensing means, such as a global satellite navigation receiver, illustrative embodiments instruct the vehicle to generate a sound above a minimum threshold level that can be heard by the visually impaired pedestrians. The generated sound may, for example, be the combustion engine of the hybrid vehicle, turned on and running for this particular block, or may be some other generated sound output, such as a high-pitched series of beeps. After the vehicle leaves the zone, illustrative embodiments turn off the mechanism generating the sound output.

In an alternate illustrative embodiment, a signal transmitting means is attached, for example, to a sign post, such as a pedestrian crosswalk sign, or a pole, such as a light or telephone pole, which may be located at the beginning of a noise generating zone. A noise generating zone is a zone in which illustrative embodiments place a vehicle in a noise generating mode of operation. The transmitted signal is received by the vehicle via a receiver, such as a communications device. It should be noted that the transmitted signal to generate the sound may, for example, also include data, such as which particular sound to generate in this particular zone (e.g., the hybrid vehicle combustion engine sound), the boundaries of the zone (e.g., 100 feet beyond the pedestrian crosswalk sign where the signal was transmitted from), and the vehicular speed limit within that particular zone (e.g., 25 miles per hour).

For many years, vehicles, such as construction equipment, delivery vehicles, and golf carts, have generated sounds when these vehicles are placed in a reverse mode of operation. This generated sound when a vehicle is placed in reverse provides a measure of safety to individuals behind the vehicle by alerting these individuals to the vehicle's intent to backup. Illustrative embodiments provide manned and unmanned vehicles additional sounds to audibly indicate intent of a vehicle to perform a particular action. For example, illustrative embodiments may direct a dump truck to generate a particular sound when the bed of the dump truck is being raised into a dumping position, to generate another particular sound when the dump truck is placed in a forward gear to complete dumping of the material, and then to generate yet another particular sound when the bed of the dump truck is being lowered.

However, as manned and unmanned vehicles use a plurality of different sounds to alert individuals in close proximity of these vehicles of the vehicles' presence and intent to perform particular operations, these noises may become very irritating to those individuals within hearing distance of the vehicles, but not within close proximity. Also, a common response by individuals to omnipresent alerting sounds is to become apathetic to the sounds and ignore them, even when the sounds are relevant. As a result, illustrative embodiments may utilize a context identifier that identifies when relevant individuals are in close proximity to the vehicles or are present within a noise generating zone to hear the alerting sounds. This identification of relevant individuals in an area may be accomplished via worker identification means, such as a work vest equipped with a radio frequency identification tag or by another human identification and localizing means. When no individual is identified as being present in an area or zone around a vehicle where alerting sounds are useful, illustrative embodiments do not generate the alerting sounds.

Figure 1:
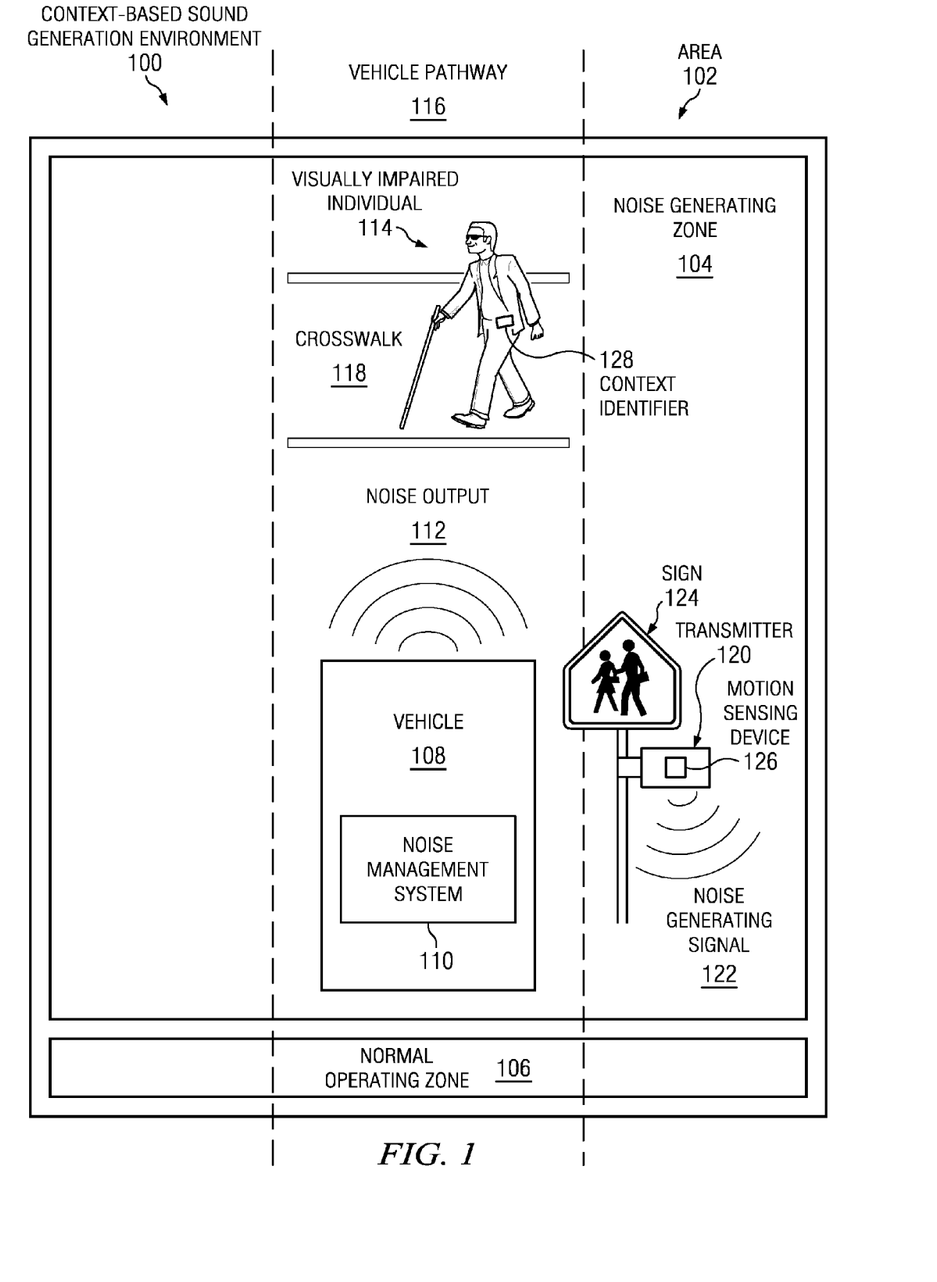
FIG. 1 is an exemplary pictorial illustration of a context-based sound generation environment in which an illustrative embodiment may be implemented.
Figure 2:
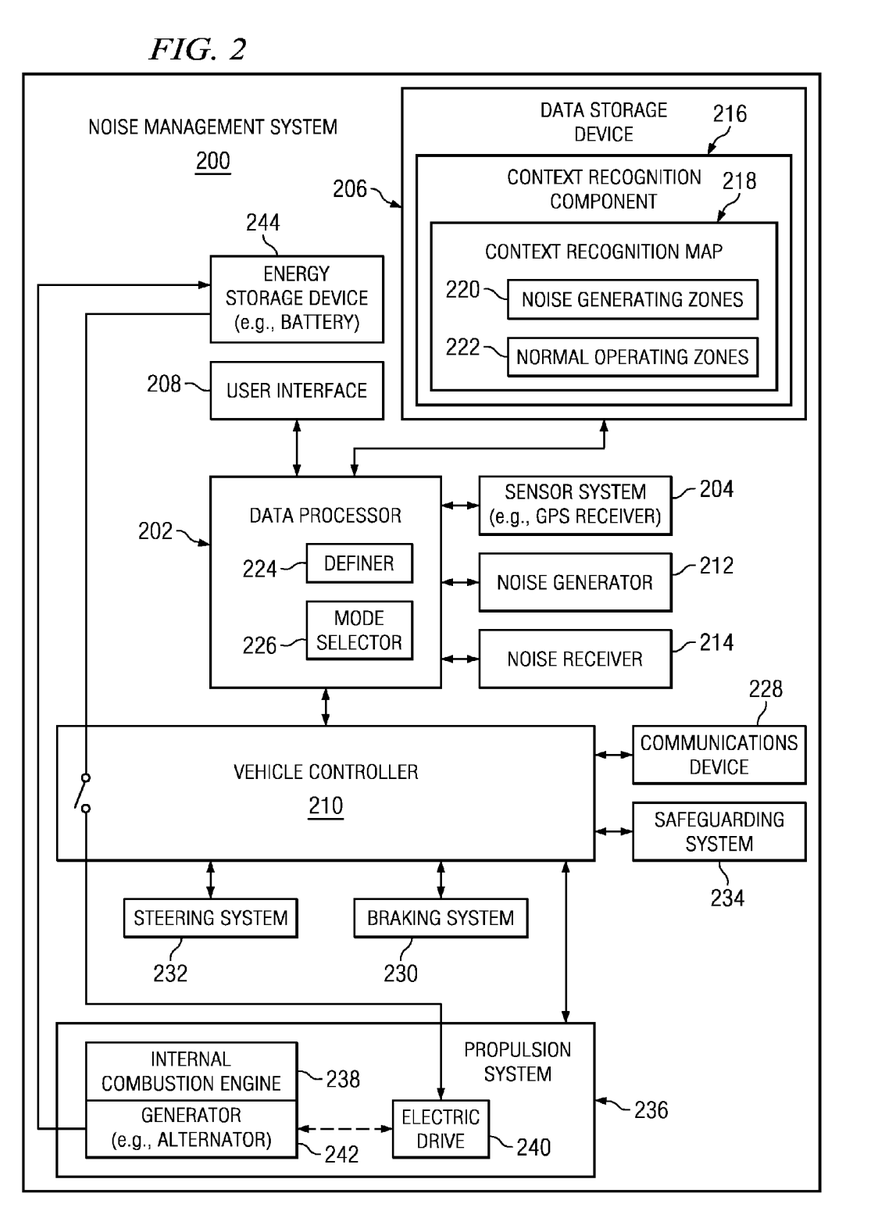
FIG. 2 is a block diagram of a noise management system in which an illustrative embodiment may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different illustrative embodiments may be implemented. Many modifications to the depicted environments may be made.

FIG. 1 depicts an exemplary pictorial illustration of a context-based sound generation environment in which an illustrative embodiment may be implemented. Context-based sound generation environment 100 is an environment where sound generation by a vehicle based on context recognition is necessary to alert individuals of the vehicle's presence and/or intent to perform a particular operation or function within the environment. Context-based sound generation environment 100 includes one or more areas, such as area 102. Area 102 may, for example, be a city.

Area 102 includes a plurality of zones, such as noise generating zone 104 and normal operating zone 106. Noise generating zone 104 is a zone in which a noise management system, such as noise management system 110, places a vehicle, such as vehicle 108, in a noise generating mode of operation. Vehicle 108 may, for example, be a quiet operating vehicle, such as a hybrid powered vehicle or an all electric powered vehicle, such as a battery powered vehicle or a fuel cell powered vehicle.

Noise management system 110 is a system of hardware and software components that is capable of context recognition to manage the generation of noises, such as noise output 112, by vehicle 108. Context recognition is the ability to identify a particular set of situations or circumstances that requires the performance of a specific function, such as generating a specific noise for the identified context. Noise management system 110 may perform context recognition using, for example, a map of area 102, which includes one or more noise generating zones and normal operating zones. It should be noted that even though noise management system 110 is located locally in vehicle 108 in this illustrative example, noise management system 110 may, for example, be located remotely in a server device that is connected to vehicle 108, which is a client of the server device, via a wireless network.

A noise generating mode is a method of operation where vehicle 108 generates noise output 112 to alert individuals, such as visually impaired individual 114 crossing vehicle pathway 116 in crosswalk 118, of the presence of vehicle 108 and/or the intent of vehicle 108 to perform a particular operation, such as increase or decrease speed of operation, using different alert sounds. Noise output 112 may, for example, be a sound produced by a combustion engine of hybrid vehicle 108, a sound produced by a horn assembly on vehicle 108, or a sound produced by a noise generating software component in noise management system 110 via a speaker system on vehicle 108.

Normal operating zone 106 is a zone in which noise management system 110 places vehicle 108 in a normal operating mode of operation. A normal operating mode is a method of operation where vehicle 108 operates normally (i.e., when vehicle 108 is not in a noise generating mode of operation). Vehicle pathway 116 is any route designated for vehicular traffic. For example, vehicle pathway 116 may be a street that traverses area 102 or may be a roadway that is entirely located within area 102.

In an alternative illustrative embodiment, noise generating zone 104 may include transmitter 120. Transmitter 120 is a transmitting device that transmits a signal, such as noise generating signal 122. Transmitter 120 may, for example, be attached to a pedestrian crossing sign, such as sign 124, which may be located at the beginning of noise generating zone 104.

Noise generating signal 122 is a wirelessly transmitted signal that instructs noise management system 110 to generate noise output 112 from vehicle 108. It should be noted that noise generating signal 122 may include data, such as the boundaries of noise generating zone 104, the speed limit within noise generating zone 104, and which particular noise to generate in noise generating zone 104. Transmitter 120 may, for example, transmit noise generating signal 122 on a continuous basis. Alternatively, transmitter 120 may transmit noise generating signal 122 on an intermittent basis. For example, transmitter 120 may include a motion sensing device, such as motion sensing device 126, to detect oncoming vehicles. In other words, motion sensing device 126 directs transmitter 120 to transmit noise generating signal 122 only when an oncoming vehicle is detected.

In yet another alternative embodiment, visually impaired individual 114 may wear a context identifier, such as context identifier 128, to identify the identity and location of visually impaired individual 114 in area 102. Context identifier 128 may, for example, be a radio frequency identification tag that may be detected and read by a radio frequency identification reader onboard vehicle 108. However, it should be noted that illustrative embodiments may utilize any type of context identifier means to identify and locate individuals within area 102.

Alternatively, an alternative embodiment may use one or more sensors within a sensor system in noise management system 110 to detect and identify visually impaired individual 114 in area 102 in addition to or instead of using context identifier 128. For example, an infrared sensor may detect and identify visually impaired individual 114 by detecting the body temperature or heat signature of visually impaired individual 114 in area 102. However, it should be noted that illustrative embodiments may utilize a combination of different sensors to identify and locate visually impaired individual 114 within area 102.

With reference now to FIG. 2, a block diagram of a noise management system is depicted in which an illustrative embodiment may be implemented. Noise management system 200 may, for example, be noise management system 110 in FIG. 1. Noise management system 200 is implemented in a vehicle, such as vehicle 108 in FIG. 1.

Noise management system 200 manages the level of vehicular noise emissions produced by the vehicle based on the location of the vehicle in relation to a context recognition map. Noise management system 200 includes data processor 202. Data processor 202 is communicatively coupled to sensor system 204, data storage device 206, user interface 208, vehicle controller 210, noise generator 212, and noise receiver 214.

Data processor 202 serves to execute instructions for software that may be loaded into data storage device 206. Data processor 202 may be a set of one or more processors or may be a multi-processor core, depending on the particular implementation. Further, data processor 202 may be implemented using one or more heterogeneous processor systems, in which a main processor is present with secondary processors on a single chip. As another illustrative example, data processor 202 may be a symmetric multi-processor system containing multiple processors of the same type.

Data processor 202 includes definer 224 and mode selector 226. Definer 224 identifies and defines the one or more noise generating zones and normal operating zones in the area based on inputted data from user interface 208 and/or communications device 228. Mode selector 226 selects a mode of operation of the vehicle based on the determined present location of the vehicle and the identified zones within the area. The mode of operation for the vehicle may, for example, be selected from a normal mode of operation and a noise generating mode of operation.

Data storage device 206 is any piece of hardware that is capable of storing information, such as, for example, without limitation, data, program code in functional form, and/or other suitable information either on a transient basis and/or a persistent basis. Data storage device 206 may, for example, include one or more memory devices and/or persistent storage devices. Memory may, for example, be random access memory, or any other suitable volatile or non-volatile storage device. Persistent storage may take various forms, depending on the particular implementation. For example, persistent storage may contain one or more components or devices. For example, persistent storage may be a hard drive, a flash memory, a rewritable optical disk, a rewritable magnetic tape, or some combination of the above. The media used by the persistent storage may be removable. For example, a removable hard drive may be used for persistent storage.

Instructions for the operating system, applications, and/or programs, which are in communication with data processor 202, may be located in data storage device 206. In these illustrative examples, the instructions are in a functional form on data storage device 206. These instructions may be loaded into memory for execution by data processor 202. Processes of the different embodiments may be performed by data processor 202 using computer implemented instructions, which may be located in data storage device 206.

These instructions are referred to as program code, computer usable program code, or computer readable program code that may be read and executed by a processor in data processor 202. The program code, in the different embodiments, may be embodied on different physical or computer readable storage media, such as memory or persistent storage within data storage device 206. Computer readable storage media may, for example, include an optical or magnetic disc that is inserted or placed into a drive or other device that is part of data storage device 206 for transfer onto a storage device, such as a hard drive, that is part of data storage device 206.

Alternatively, program code may be transferred to noise management system 200 using computer readable signal media. Computer readable signal media may, for example, be a propagated data signal containing program code. For example, computer readable signal media may be an electromagnetic signal, an optical signal, and/or any other suitable type of signal. These signals may be transmitted over communications links, such as wireless communications links and/or any other suitable type of communications link. The computer readable media also may take the form of nontangible media, such as communications links or wireless transmissions containing the program code.

In some illustrative embodiments, the program code may be downloaded over a network to data storage device 206 from another device or data processing system through computer readable signal media for use within noise management system 200. For instance, program code stored in a computer readable storage media in a data processing system may be downloaded over a network from the server to noise management system 200. The data processing system providing the program code may be a server computer, a client computer, or some other device capable of storing and transmitting the program code.

In this illustrative example, data storage device 206 stores context recognition component 216. Context recognition component 216 is a software application that provides context recognition for the vehicle. Context recognition component 216 includes context recognition map 218. Context recognition map 218 is a geographic map of an area, such as area 102 in FIG. 1, which includes vehicular pathways, such as vehicular pathway 116 in FIG. 1. In addition, context recognition map 218 includes one or more noise generating zones, such as noise generating zones 220, and one or more normal operating zones, such as normal operating zones 222. Noise generating zones 220 may, for example, represent noise generating zones included in the area, such as noise generating zone 104 included in area 102 in FIG. 1, and normal operating zones 222 may, for example, represent normal operating zones included in the area, such as normal operating zone 106 included in area 102 in FIG. 1.

Sensor system 204 may include a set of one or more sensor devices. For example, sensor system 204 may include a location-determining receiver, such as a Global Positioning System (GPS) receiver with differential correction, an inertial guidance sensor, an accelerometer, a gyroscope, a wheel sensor, an odometer, and a compass. A GPS receiver with differential correction is but one illustrative example of a location-determining receiver. Sensor system 204 may use the location-determining device to determine the present location of the vehicle within the area.

User interface 208 may include a display device for displaying information to a user, as well as receive input from the user through touch screen technology. In addition, user interface may include a keyboard, a keypad, a pointing device, such as a mouse or trackball, a magnetic disc drive, a magnetic tape drive, an optical disc drive, a data port, such as a parallel, serial or a Universal Serial Bus (USB) port, or any another mechanism for inputting or entering data into noise management system 200. User interface 208 may support the communication or input of data via a physical media, such as a memory card or a floppy disc, or via a wireless interface, such as Bluetooth technology or wireless fidelity (Wi-Fi) technology.

The inputted data may, for example, be one or more maps of one or more geographic areas, such as road maps. In addition, user interface 208 supports a user's ability to enter or input location data, such as a set of two or three dimensional coordinates, which indicate the boundaries of one or more noise generating zones, normal operating zones, or other reference location data, for a particular area. Reference location data may, for example, include data, such as street addresses of one or more visually impaired individuals or the locations of one or more parks where children often play.

The user may define or classify noise generating zones based on one or more of the following factors, among other considerations: air temperature, pressure, and humidity, which impact how well sound propagates through the air; ground topography, which may tend to block or diminish sound with respect to a particular location; location of vegetation, which may tend to absorb sound, and the amount of vegetation present during a particular season or time of year; noise generating histories for the vehicle for a particular area; event calendars for adjacent parks, schools, and sporting arenas; and weekends/holidays versus weekdays for likely increased pedestrian traffic. A user or definer 224 may define one or more noise generating zones in an area by identifying locations on a map, such as locations that include the presence of homes that have visually impaired individuals living in them, businesses, or recreational areas, and then using a determined radius from these identified locations to generate the one or more noise generating zones within the area.

It should be noted that the user may also define multiple classes of noise generating zones, which have corresponding noise level ranges or minimum noise level threshold values. For example, the user may define three different types of noise generating zones. The first class of noise generating zone may correspond to a minimum noise level threshold value; the second class of noise generating zone may correspond to a higher minimum noise level threshold value; and the third class of noise generating zone may correspond to a highest minimum noise level threshold value. The minimum noise level threshold value is associated with a noisy state of operation of the vehicle, the higher minimum noise level threshold value is associated with a noisier state of operation, and the highest minimum noise level threshold value is associated with a noisiest state of operation of the vehicle up to a maximum noise level threshold.

In one embodiment, each noise generating zone is a zone in an area where the noise generated by the vehicle is greater than or equal to the minimum noise level threshold. In another embodiment, each noise generating zone is associated with a corresponding different minimum noise level threshold or a corresponding different range of noise level thresholds. In a noise generating zone, the vehicle operates in a noise generating mode. A normal operating zone or noise insensitive zone is a zone where the noise generated by the vehicle may fall below the defined minimum noise level threshold. In a normal operating zone, the vehicle operates in a normal operating mode.

Data processor 202 uses the present vehicle location determined by sensor system 204 to reference context recognition map 218 or other reference location data in data storage device 206, which identifies noise generating zones 220 and normal operating zones 222 for an area. In noise generating zones 220 under one illustrative embodiment, only internal combustion engine power may be used in a hybrid vehicle, for example, with the internal combustion engine turned on to increase noise. Under another illustrative embodiment, data processor 202 may control other vehicle components to meet noise requirements associated with a particular location. For example, data processor 202 may direct noise generator 212 to generate a particular noise based on context recognition or the vehicle's intent to perform a particular action.

Noise generator 212 may, for example, be a speaker system or other noise generating device, such as a horn, which may generate one or more different sounds. The speaker system may be any type of electromechanical transducer that converts an electrical signal to sound. Each different generated sound or noise may be associated with a different recognized context or vehicle action.

In addition to generating one or more different sounds, noise generator 212 may, for example, also synthetically generate voice messages or output recorded voice messages. The synthetically generated or recorded voice messages may, for example, say "Caution, vehicle approaching," "Vehicle within two-hundred feet," "Vehicle now within one-hundred feet," and so on. Further, noise generator 212 may direct or focus the outputted sound or voice message in a preferred direction, such as the direction of travel of the vehicle or such as the direction of an identified individual within the noise generating zone.

Data processor 202 uses noise receiver 214 to gather feedback on the level of noise generated by the vehicle when operating in noise generating zones 220, for instance, to insure that the vehicle sound emissions are above the determined minimum sound threshold level. Noise receiver 214 may, for example, be a microphone. The microphone may be any type of sensor that is capable of converting sound waves into electrical signals.

Vehicle controller 210 is communicatively coupled to communications device 228, braking system 230, steering system 232, safeguarding system 234, and propulsion system 236 of the vehicle. Vehicle controller 210 may execute processes using control software to control communications device 228, braking system 230, steering system 232, safeguarding system 234, and propulsion system 236. In addition, vehicle controller 210 may utilize one or more different sensors in sensor system 204 to identify the operating environment around the vehicle. Vehicle controller 210 may select from these different sensors so that at least one of these sensors is always capable of sensing information needed to operate the vehicle in different operating environments.

Communications device 228, in these examples, provides for communication with other data processing systems or devices in communication with noise management system 200. Communications device 228 may, for example, be a modem or a network interface card. In addition, communication device 228 may communicate using AM radio frequency transceivers, FM radio frequency transceivers, cellular units, Bluetooth technology receivers, Wi-Fi technology transceivers, and Worldwide Interoperability for Microwave Access (WiMAX) technology transceivers. Communications device 228 may provide communications through the use of either or both physical and wireless communications links.

Braking system 230 provides a means for a user and/or vehicle controller 210 to brake and stop the vehicle as needed. Steering system 232 provides a means for a user and/or vehicle controller 210 to guide and maneuver the vehicle as needed. Safeguarding system 234 provides information to vehicle controller 210 and/or to the user via user interface 208 to safeguard the vehicle during operation.

Propulsion system 236 provides a means to propel or move the vehicle as needed. In this illustrative example, propulsion system 236 includes internal combustion engine 238 and electric drive 240. Propulsion system 236 may, for example, drive wheels, tracks, legs, and/or rollers associated with the vehicle. Internal combustion engine 238 and electric drive 240 are either directly or indirectly mechanically coupled to the wheels, tracks, legs, and/or rollers associated with the vehicle for propulsion of the vehicle.

Internal combustion engine 238 may incorporate or be associated with generator 242 for generating electrical energy. For example, generator 242 may comprise a generator or an alternator rotationally coupled via, for example, a belt or a chain to a rotational shaft of internal combustion engine 238. Generator 242 is electrically coupled to energy storage device 244 for charging of energy storage device 244. Internal combustion engine 238 applies rotational energy to generator 242 in a charging mode of operation. Energy storage device 244 may include an energy source or one or more batteries for providing stored electrical energy to electric drive 240 of propulsion system 236.

The different components illustrated in noise management system 200 are not meant to provide architectural limitations to the manner in which different embodiments may be implemented. The different illustrative embodiments may be implemented in a noise management system that includes components in addition to or in place of those illustrated for noise management system 200. In addition, different components illustrated in noise management system 200, such as data processor 202 and/or one or more components of data storage device 206, may be located on a remote data processing system, which is communicatively coupled to noise management system 200. In other words, when remotely located, data processor 202 may provide remote direction to the vehicle to operate in a noise generating mode.

Further, components shown in FIG. 2 may be varied from the illustrative examples shown. The different embodiments may be implemented using any hardware device or system capable of executing the program code. As one example, noise management system 200 may include organic components integrated with inorganic components. For example, data storage device 206 may be comprised of an organic semiconductor.

Figure 3:
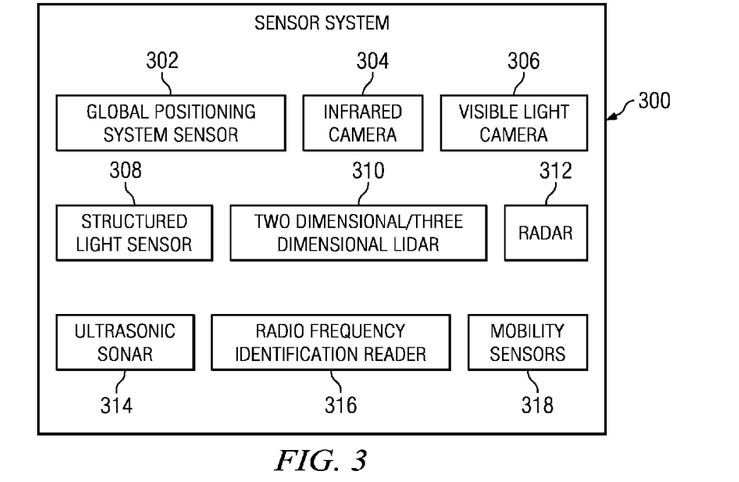
FIG. 3 is a block diagram of a sensor system in accordance with an illustrative embodiment.

With reference now to FIG. 3, a block diagram of a sensor system is depicted in accordance with an illustrative embodiment. Sensor system 300 may, for example, be sensor system 204 in FIG. 2. Sensor system 300 is a set of data gathering devices, which send the gathered data to a processor device, such as data processor 202 in FIG. 2, for processing in order to control the level of noise output by a vehicle, such as vehicle 108 in FIG. 1.

Sensor system 300 includes redundant sensors. A redundant sensor in these examples is a sensor that may be used to compensate for the loss and/or inability of another sensor to obtain information needed to control the vehicle. A redundant sensor may be another sensor of the same type (i.e., homogenous) and/or a different type of sensor (i.e., heterogeneous) that is capable of providing information for the same purpose as the other sensor.

In this illustrative example, sensor system 300 includes global positioning system sensor 302, infrared camera 304, visible light camera 306, structured light sensor 308, two dimensional/three dimensional light detection and ranging (LIDAR) 310, radio detection and ranging (RADAR) 312, ultrasonic sonar 314, radio frequency identification reader 316, and mobility sensors 318. These different sensors may be used to identify the environment around the vehicle, as well as a context identifier worn by an individual, such as context identifier 128 worn by visually impaired individual 114 in FIG. 1.

For example, one or more of these sensors may be used to detect the presence, identity, and location of the individual wearing the context identifier. In another example, one or more of these sensors may be used to detect dynamic conditions within the operating environment of the vehicle. The sensors in sensor system 300 may be selected such that at least one of the sensors is always capable of sensing information needed to operate the vehicle in different operating environments in a safe manner.

Global positioning system sensor 302 may identify the location of the vehicle with respect to other objects in the operating environment. Global positioning system sensor 302 may be any type of radio frequency triangulation scheme based on signal strength and/or time of flight. Examples include, without limitation, the Global Positioning System, Glonass, Galileo, and cell phone tower relative signal strength. Position is typically reported as latitude and longitude with an error that depends on factors, such as ionispheric conditions, satellite constellation, and signal attenuation from vegetation.

Infrared camera 304 may form an image using infrared radiation. Thus, infrared camera 304 may detect heat indicative of a living thing versus an inanimate object in the operating environment around the vehicle. For example, infrared camera 304 can detect the presence of a human operator when other sensors of sensor system 300 may fail, providing failsafe redundancy to a vehicle operating with individuals in close proximity.

Visible light camera 306 may be a standard still-image camera, which may be used alone for color information or with a second camera to generate stereoscopic or three-dimensional images. When visible light camera 306 is used along with a second camera to generate stereoscopic images, the two or more cameras may be set with different exposure settings to provide improved performance over a range of lighting conditions. Visible light camera 306 may also be a video camera that captures and records moving images. As a result, visible light camera 306 may be a component in a video-based object recognition system. The video-based object recognition system uses shape recognition to trigger alerts when a target is matched.

Structured light sensor 308 emits light in a pattern, such as one or more lines, reads back the reflections of light pattern through a camera, and interprets the reflections to detect and measure objects in the operating environment. Two dimensional/three dimensional light detection and ranging 310 is an optical remote sensing technology that measures properties of scattered light to find range and/or other information of a distant target. Two dimensional/three dimensional light detection and ranging 310 emits laser pulses as a beam, than scans the beam to generate two dimensional or three dimensional range matrices. The range matrices are used to determine distance to an object or surface by measuring the time delay between transmission of a pulse and detection of the reflected signal.

Radio detection and ranging 312 is an object detection system that uses electromagnetic waves to identify the range, altitude, direction, or speed of both moving and fixed objects. Radio detection and ranging 312 may be used in a time of flight mode to calculate distance to an object, as well as Doppler mode to calculate the speed of an object.

Ultrasonic sonar 314 uses sound propagation on an ultrasonic frequency to measure the distance to an object by measuring the time from transmission of a pulse to reception and converting the measurement into a range using the known speed of sound. Ultrasonic sonar 314 may also be used in a time of flight mode or Doppler mode, similar to radio detection and ranging 312.

Radio frequency identification reader 316 wirelessly retrieves data from radio frequency identification tags or transponders, which may be worn by individuals in the operating environment of the vehicle. The retrieved data may include information, such as the identity and location of the individual wearing the tag.

Mobility sensors 318 may be used to safely and efficiently guide the vehicle through the operating environment. Mobility sensors 318 may, for example, include an odometer, a compass for dead reckoning, vision-based triangulation systems, and/or any other suitable sensor.

Sensor system 300 may retrieve environmental data from one or more of the sensors to obtain different perspectives of the operating environment of the vehicle. For example, sensor system 300 may obtain visual data from visible light camera 306, data about the distance of the vehicle in relation to individuals in the operating environment from two dimensional/three dimensional light detection and ranging 310, and location data of the vehicle in relation to a map from global positioning system sensor 302.

In addition to receiving different perspectives of the environment, sensor system 300 provides redundancy in the event of a sensor failure, which facilitates high-integrity operation of the vehicle. For example, in an illustrative embodiment, if visible light camera 306 is the primary sensor used to identify the location of an individual in the operating environment of the vehicle, and visible light camera 306 fails, radio frequency identification reader 316 will still detect the location of the individual through the radio frequency identification tag worn by the individual, thereby providing redundancy for safe operation of the vehicle.

Figure 4:
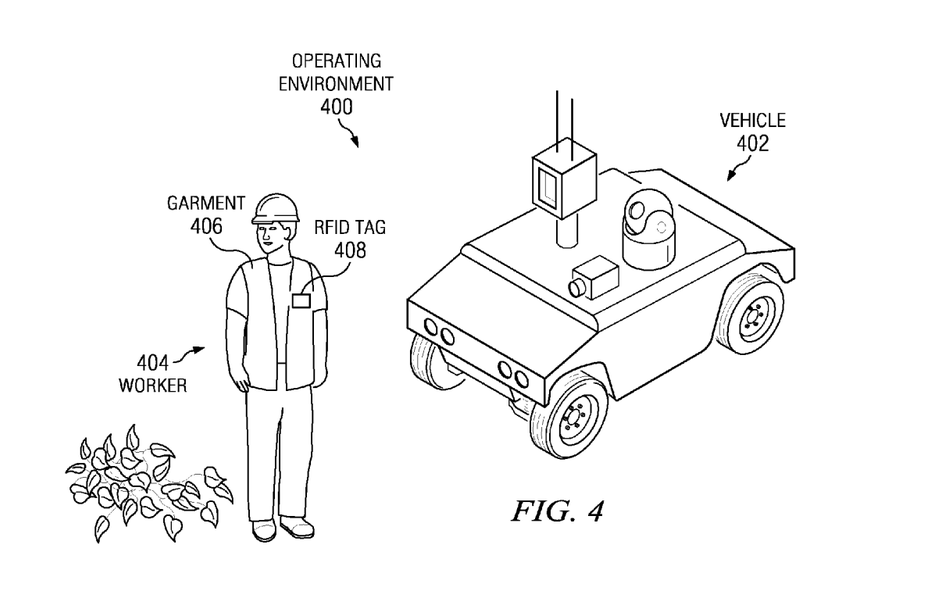
FIG. 4 is an exemplary pictorial illustration of an operating environment of an autonomous vehicle in accordance with an illustrative embodiment.

With reference now to FIG. 4, an exemplary pictorial illustration of an operating environment of an autonomous vehicle is depicted in accordance with an illustrative embodiment. Operating environment 400 may, for example, be area 102 in FIG. 1. Operating environment 400 is the environment in which vehicle 402 is currently operating within. In this example, operating environment 400 may be any type of structured work-site with vegetation, such as crops, trees, bushes, flower beds, grass, or other foliage.

Also in this example, vehicle 402 may be any type of manned vehicle, unmanned or autonomous vehicle, or semi-autonomous vehicle used to perform any number of operations, actions, or tasks. Vehicle 402 may perform operations under the direct control of an operator, independently of the operator, simultaneously with the operator, or in a coordinated manner with the operator or with other autonomous or semi-autonomous vehicles. Vehicle 402 may be one of a plurality of vehicles performing tasks in operating environment 400.

Vehicle 402 may include wheels, tracks, legs, rails, and/or rollers. Vehicle 402 may, for example, be an agricultural vehicle used for harvesting, threshing, or cleaning crops. In another example, vehicle 402 may be a forestry vehicle having functions, such as felling, bucking, forwarding, or other suitable forestry functions. In yet another example, vehicle 402 may be a delivery vehicle, such as those for the post office or other commercial delivery companies.

Worker 404 is one illustrative example of an operator that may work in coordination with vehicle 402 in operating environment 400. Worker 404 may be one or a plurality of workers in operating environment 400. As a result, illustrative embodiments may be implemented using any number of vehicles and any number of workers/operators within operating environment 400.

In this illustrative example, worker 404 wears garment 406. Even though worker 404 is a human in this illustrative example, worker 404 may include, without limitation, an animal, a robot, an instance of an autonomous vehicle, or any other suitable operator.

Also in this illustrative example, garment 406 may be any type of garment worn by worker 404. For example, garment 406 may include, without limitation, a vest, a jacket, a helmet, a shirt, a jumpsuit, a glove, and the like. Garment 406 includes radio frequency identification tag 408, which may be a context identifier, such as context identifier 128 in FIG. 1. Radio frequency identification tag 408 may store and process information, as well as transmit and receive a signal through a built-in antennae. Radio frequency identification tag 408 is detected by a radio frequency identification reader located in a sensor system, such as radio frequency identification reader 316 located in a sensor system 300 of FIG. 3.

Radio frequency identification tag 408 may operate on one or more different frequencies to provide high integrity to the detection of garment 406. In addition, garment 406 may include a plurality of radio frequency identification tags. Radio frequency identification tag 408 allows for wireless communication between garment 406 and vehicles within the same operating environment.

In addition to radio frequency identification tag 408, garment 406 may include a particular shape, color, and/or pattern. The particular shape of the garment may be a narrow band, such as a belt, or a wide band, such as a shirt or vest. The particular color of the garment may be the color of the entire garment or may be the color of only a portion or a block of the garment. The particular pattern may be, without limitation, a visible logo, a visible symbol, a barcode, or patterned garment material. The particular shape, color, and/or pattern may also be used to identify the wearer of garment 406, as well as localize the wearer.

Vehicle 402 and garment 406 operate in a coordinated manner using high integrity systems. As used herein, "high integrity" when used to describe a component means that the component performs well across different operating environments. In other words, as the external environment changes to reduce the capability of components in a system or a component internally fails in the system, a level of redundancy is present in the number and the capabilities of remaining components to provide fail-safe or preferably fail-operational perception of the environment without human monitoring or intervention.

Redundant sensors in these examples are sensors that may be used to compensate for the loss and/or inability of other sensors to obtain information needed to control a vehicle or to detect a worker. A redundant use of the sensor sets are governed by the intended use of each of the sensors and their degradation in certain dynamic conditions. The sensor sets robustly provide data for localization and/or safeguarding in light of a component failure or a temporary environmental condition. For example, dynamic conditions may be terrestrial and weather conditions that affect sensors and their ability to contribute to localization and safeguarding. Such conditions may include, without limitation, sun, clouds, artificial illumination, full moon light, new moon darkness, degree of sun brightness based on sun position due to season, shadows, fog, smoke, sand, dust, rain, snow, and the like.

Illustrative embodiments provide vehicle 402 with the capability of context recognition. In addition, illustrative embodiments provide vehicle 402 with the capability to alert worker 404 of the intent of vehicle 402 to perform a particular task within operating environment 400 by generating a plurality of different alert sounds so that worker 404 may identify each of the different tasks performed by vehicle 402 by the particular sound generated. Vehicle 402 includes a noise management system, such as noise management system 200 in FIG. 2, to provide the context recognition and alert sound capabilities.

Also, the noise management system may, for example, modify the alert sound by increasing the intensity of the generated alert sound as worker 404 gets closer to vehicle 402. Conversely, the noise management system may decrease the intensity of the generated alert sound as worker 404 gets farther away from vehicle 402. Alternatively, the noise management system may increase the frequency or the number of times the sound, such as a beeping sound, is generated per unit of time as worker 404 gets closer to vehicle 402 and decrease the frequency of the generated sound as worker 404 gets farther away from vehicle 402. However, it should be noted that illustrative embodiments may use a combination of alert sound intensity and frequency modifications to alert worker 404 of the proximity of vehicle 402 and/or vehicle 402's intent to perform a particular action. Moreover, it should be noted that illustrative embodiments may also use recorded or synthetically generated voice messages or patterns of speech to communicate vehicle proximity and/or intent.

Figure 5:
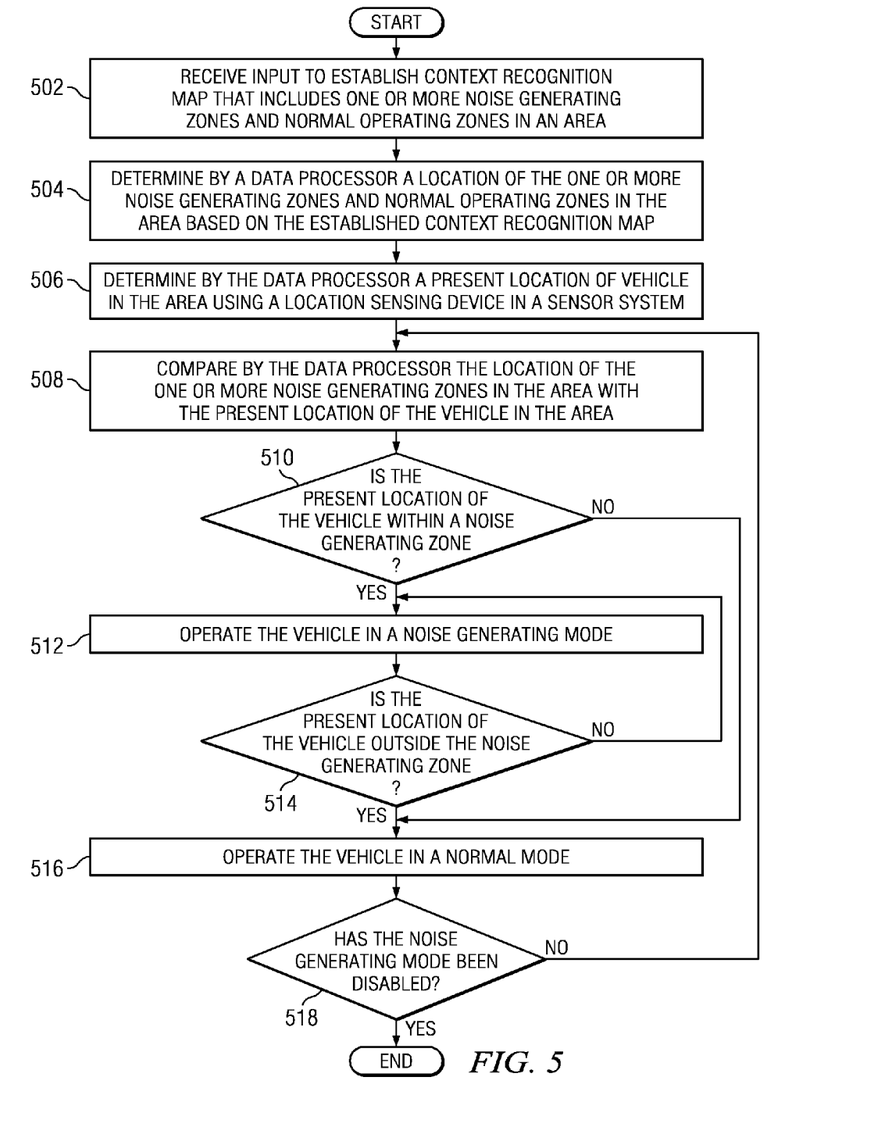
FIG. 5 is a flowchart illustrating an exemplary process for determining when to operate a vehicle in a noise generating mode based on context recognition in accordance with an illustrative embodiment.

With reference now to FIG. 5, a flowchart illustrating an exemplary process for determining when to operate a vehicle in a noise generating mode based on context recognition is shown in accordance with an illustrative embodiment. The process shown in FIG. 5 may be implemented in a noise management system, such as noise management system 200 in FIG. 2. The noise management system may be implemented in a vehicle, such as noise management system 110 implemented in vehicle 108 in FIG. 1.

The process begins when the noise management system receives input from a user via a user interface, such as user interface 208 in FIG. 2, to establish a context recognition map that includes one or more noise generating zones and normal operating zones, such as context recognition map 218 that includes noise generating zones 220 and normal operating zones 222 in FIG. 2, in an area, such as area 102 in FIG. 1 (step 502). In addition, the noise management system may also receive input from one or more network data processing systems via a communications device, such as communications device 228 in FIG. 2, to establish the context recognition map.

Then, the noise management system uses a data processor, such as data processor 202 in FIG. 2, to determine a location of the one or more noise generating zones and the normal operating zones in the area based on the established context recognition map (step 504). In addition, the data processor determines a present location of the vehicle in the area using a location sensing device in a sensor system, such as global positioning system sensor 302 in sensor system 300 in FIG. 3 (step 506).

Afterward, the data processor compares the location of the one or more noise generating zones in the area with the present location of the vehicle in the area (step 508). Then, the data processor makes a determination as to whether the present location of the vehicle is within a noise generating zone (step 510). If the present location of the vehicle is not within a noise generating zone, then process proceeds to step 516. If the present location of the vehicle is within a noise generating zone, yes output of step 510, then the data processor directs the vehicle to operate in a noise generating mode (step 512).

Then, the data processor makes a determination as to whether the present location of the vehicle is outside the noise generating zone (step 514). If the present location of the vehicle is not outside the noise generating zone, then process returns to step 512 where the vehicle continues to operate in a noise generating mode. If the present location of the vehicle is outside the noise generating zone, yes output of step 514, then the data processor directs the vehicle to operate in a normal mode of operation (step 516).

Subsequently, the data processor makes a determination as to whether the noise generating mode has been disabled (step 518). The noise generating mode may, for example, be manually disabled by the user via the user interface. As another example, the noise generating mode may be automatically disabled by the data processor based on input from the sensor system that no individuals are present in the area.

If the noise generating mode has not been disabled, no output of step 518, then the process returns to step 508 where the data processor continues to compare the location of the one or more noise generating zones in the area with the present location of the vehicle in the area. If the noise generating mode has been disabled, yes output of step 518, then the process terminates thereafter.

Figure 6:
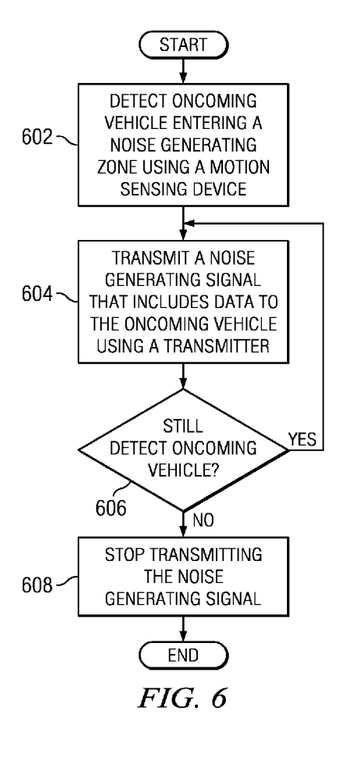
FIG. 6 is a flowchart illustrating an exemplary process for transmitting a noise generating signal to a vehicle in accordance with an illustrative embodiment.

With reference now to FIG. 6, a flowchart illustrating an exemplary process for transmitting a noise generating signal to a vehicle is shown in accordance with an illustrative embodiment. The process shown in FIG. 6 may be implemented in a transmitter, such as transmitter 120 in FIG. 1.

The process begins when the transmitter uses a motion sensing device, such as motion sensing device 126 in FIG. 1, to detect an oncoming vehicle entering a noise generating zone, such as vehicle 108 entering noise generating zone 104 in FIG. 1 (step 602). After detecting the oncoming vehicle in step 602, the transmitter transmits a noise generating signal, such as noise generating signal 122 in FIG. 1, which includes data, to the oncoming vehicle (step 604).

Then, the transmitter makes a determination as to whether the motion sensing device still detects an oncoming vehicle (step 606). If the motion sensing device still detects an oncoming vehicle, yes output of step 606, then the process returns to step 604 where the transmitter continues to transmit the noise generating signal. If the motion sensing device does not still detect an oncoming vehicle, no output of step 606, then the transmitter stops transmitting the noise generating signal (step 608). The process terminates thereafter.

Figure 7:
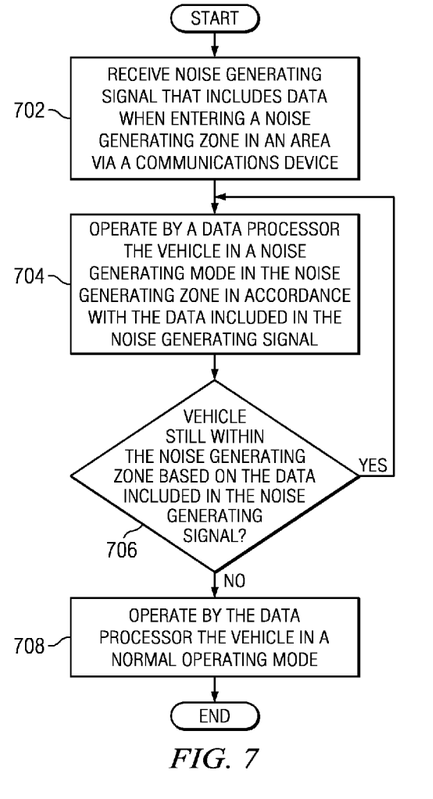
FIG. 7 is a flowchart illustrating an exemplary process for operating a vehicle in a noise generating mode based on a received noise generating signal in accordance with an illustrative embodiment.

With reference now to FIG. 7, a flowchart illustrating an exemplary process for operating a vehicle in a noise generating mode based on a received noise generating signal is shown in accordance with an illustrative embodiment. The process shown in FIG. 7 may be implemented in a noise management system, such as noise management system 200 in FIG. 2. The noise management system may be implemented in a vehicle, such as noise management system 110 implemented in vehicle 108 in FIG. 1.

The process begins when the noise management system uses a communications device, such as communications device 228 in FIG. 2, to receive a noise generating signal, such as noise generating signal 122 in FIG. 1, which includes data, when entering a noise generating zone in an area, such as noise generating zone 104 in area 102 in FIG. 1 (step 702). Subsequent to receiving the noise generating signal in step 702, the noise management system uses a data processor, such as data processor 202 in FIG. 2, to operate the vehicle in a noise generating mode in the noise generating zone in accordance with the data included in the noise generating signal (step 704).

Then, the data processor makes a determination as to whether the vehicle is still within the noise generating zone based on the data included in the noise generating signal (step 706). If the vehicle is still within the noise generating zone, yes output of step 706, then the process returns to step 704 where the data processor continues to operate the vehicle in a noise generating mode of operation. If the vehicle is not still within the noise generating zone, no output of step 706, then the data processor operates the vehicle in a normal operating mode (step 708). The process terminates thereafter.

Figure 8:
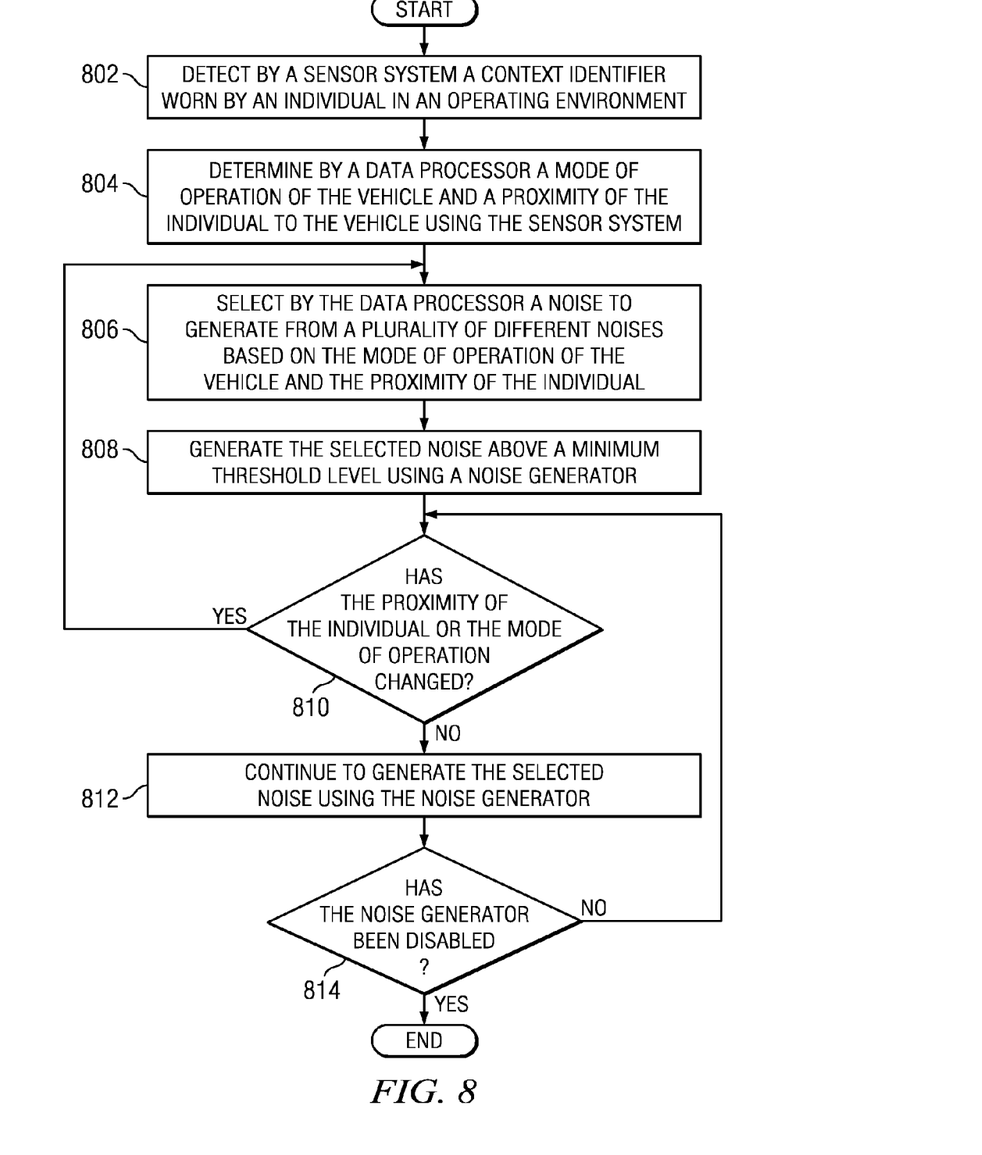
FIG. 8 is a flowchart illustrating an exemplary process for selecting a particular noise to generate by a vehicle based on context in accordance with an illustrative embodiment.

With reference now to FIG. 8, a flowchart illustrating an exemplary process for selecting a particular noise to generate by a vehicle based on context is shown in accordance with an illustrative embodiment. The process shown in FIG. 8 may be implemented in a noise management system, such as noise management system 200 in FIG. 2. The noise management system may be implemented in a vehicle, such as noise management system 110 implemented in vehicle 108 in FIG. 1.

The process begins when the noise management system uses a sensor system, such as sensor system 204 in FIG. 2, to detect a context identifier worn by an individual, such as context identifier 128 worn by visually impaired individual 114 in FIG. 1, in an operating environment, such as operating environment 400 in FIG. 4 (step 802). After detecting the context identifier in step 802, the noise management system uses a data processor, such as data processor 202 in FIG. 2, to determine a mode of operation of the vehicle and a proximity of the individual to the vehicle using the sensor system (step 804). The mode of operation may, for example, be the vehicle's intent to perform a particular task, function, or operation in the operating environment.

Then, the data processor selects a noise to generate from a plurality of different noises based on the mode of operation of the vehicle and the proximity of the individual (step 806). Subsequent to selecting the noise to generate in step 806, the data processor uses a noise generator, such as noise generator 212 in FIG. 2, to generate the selected noise above a minimum threshold level (step 808). Afterward, the data processor makes a determination as to whether the proximity of the individual or the mode of operation has changed (step 810).

If the proximity of the individual to the vehicle or the mode of operation of the vehicle has changed, yes output of step 810, then the process returns to step 806 where the data processor select another noise to generate from the plurality of different noises. However, it should be noted that instead of selecting a new noise to generate, the data processor may modify the frequency and/or the intensity of the noise previously selected for generation. If the proximity of the individual to the vehicle or the mode of operation of the vehicle has not changed, no output of step 810, then the data processor continues to generate the selected noise using the noise generator (step 812).

Then, the data processor makes a determination as to whether the noise generator been disabled (step 814). The noise generator may, for example, be manually disabled by the user via a user interface, such as user interface 208 in FIG. 2. As another example, the noise generator may be automatically disabled by the data processor based on input from the sensor system that no individuals are present in the operating environment.

If the noise generator has not been disabled, no output of step 814, then the process returns to step 810 where the data processor continues to make a determination as to whether the proximity of the individual or the mode of operation has changed. If the noise generator has been disabled, yes output of step 814, then the process terminates thereafter.

Thus, illustrative embodiments provide a method and system for generating a noise by a vehicle above a minimum threshold level based on a context. The foregoing method and system establishes a practical data management scheme for storing noise generating zones, noise insensitive zones, or both in a manner that is independent from the operator's observations, memory, or familiarity with an area. The system and method is capable of automatically switching from a noise generating mode to a normal operating mode, or vice versa, without operator intervention or in a manner that is transparent to an operator. The automatic switch from the noise generating mode to the normal operating mode, and vice versa, is well suited for application to manned vehicles, unmanned or autonomous vehicles, and semi-autonomous vehicles. The method and system automates the enabling and disabling of the noise generating mode in a consistent manner that meets noise generation goals and safety goals of illustrative embodiments.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a noise management system for directing a vehicle to operate in a noise generating mode based on a context, the computer implemented method comprising:

determining by a processor device, using a location sensing device communicatively coupled to the processor device, a present location of the vehicle;

determining by the processor device whether the present location of the vehicle is within one or more noise generating zones; and responsive to a determination by the processor device that the present location of the vehicle is within a noise generating zone, directing the vehicle to operate in the noise generating mode.

2. The computer implemented method of claim 1 further comprising:

responsive to a determination by the processor device that the present location of the vehicle is not within a noise generating zone, directing the vehicle to operate in a normal operating mode.

3. The computer implemented method of claim 1, wherein the context is surrounding circumstances that form an environment within which the vehicle is placed in the noise generating mode of operation to alert an individual in the noise generating zone of a presence of the vehicle.

4. The computer implemented method of claim 3, wherein the individual is one of a person, an animal, or a machine.

5. The computer implemented method of claim 1, wherein the noise generating zone is one of a plurality of specific noise generating zones in an area, and wherein each noise generating zone in the plurality of specific noise generating zones has a different associated noise generated by the vehicle.

6. The computer implemented method of claim 5, wherein the plurality of specific noise generating zones includes a plurality of classes of noise generating zones each having a corresponding different minimum noise level threshold value.

7. The computer implemented method of claim 1, wherein the context is identified by a context recognition map that includes the one or more noise generating zones, and wherein the context recognition map is a geographic map of the area that includes vehicular pathways.

8. The computer implemented method of claim 1, wherein the vehicle is a hybrid powered vehicle, and wherein noise generated by the hybrid powered vehicle in the noise generating zone is a running combustion engine.

9. The computer implemented method of claim 1, wherein the vehicle is an all electric powered vehicle, and wherein noise generated by the all electric powered vehicle in the noise generating zone is a synthetically generated sound.

10. The computer implemented method of claim 9, wherein the sound is one or more of a voice message, a combustion engine, and a horn.

11. A vehicle comprising:
a noise management system;
a sensor system for collecting data regarding an operating environment for the vehicle; and
a processor device communicatively coupled to the noise management system and the sensor system; wherein the processor device determines a present location of the vehicle using a location sensing device located in the sensor system; determines whether the present location of the vehicle is within one or more noise generating zones; and directs the vehicle to operate in a noise generating mode in response to a determination that the present location of the vehicle is within a noise generating zone.

12. The vehicle of claim 11, wherein the processor device directs the vehicle to operate in a normal operating mode in response to a determination that the present location of the vehicle is not within a noise generating zone.

13. The vehicle of claim 11, wherein a context is surrounding circumstances that form an environment within which the vehicle is placed in the noise generating mode of operation to alert an individual in the noise generating zone of a presence of the vehicle.

14. The vehicle of claim 13, wherein the individual is one of a person, an animal, or a machine.

15. The vehicle of claim 11, wherein the noise generating zone is one of a plurality of specific noise generating zones in an area, and wherein each noise generating zone in the plurality of specific noise generating zones has a different associated noise generated by the vehicle.

16. The vehicle of claim 15, wherein the plurality of specific noise generating zones includes a plurality of classes of noise generating zones each having a corresponding different minimum noise level threshold value.

17. The vehicle of claim 11, wherein the context is identified by a context recognition map that includes the one or more noise generating zones, and wherein the context recognition map is a geographic map of the area that includes vehicular pathways.

18. The vehicle of claim 11, wherein the vehicle is a hybrid vehicle, and wherein noise generated by the hybrid powered vehicle in the noise generating zone is a running combustion engine.

19. The vehicle of claim 11, wherein the vehicle is an all electric powered vehicle, and wherein noise generated by the all electric powered vehicle in the noise generating zone is a synthetically generated sound.

20. The vehicle of claim 19, wherein the sound is one or more of a voice message, a combustion engine, and a horn.

21. A computer implemented method in a noise management system for generating a noise by a vehicle, the computer implemented method comprising:
detecting by a sensor device communicatively coupled to the noise management system an individual in an operating environment of the vehicle;
determining by a processor device communicatively coupled communicatively coupled to the noise management system a mode of operation of the vehicle and a proximity of the individual to the vehicle using the sensor device;
selecting by the processor device a noise to generate from a plurality of different noises based on the mode of operation of the vehicle and the proximity of the individual to the vehicle; and
responsive to selecting the noise to generate, generating the selected noise above a minimum threshold level to alert the individual of the mode of operation of the vehicle and the proximity of the individual to the vehicle.

22. The computer implemented method of claim 21 further comprising:
determining by the processor device whether the proximity of the individual to the vehicle or the mode of operation of the vehicle has changed; and
responsive to determining that the proximity of the individual to the vehicle or the mode of operation of the vehicle has changed, selecting by the processor device another noise to generate from the plurality of different noises.

23. The computer implemented method of claim 22 further comprising:
responsive to determining that the proximity of the individual to the vehicle or the mode of operation of the vehicle has changed, modifying by the processor device a frequency of a number of times the selected noise is generated per unit time.

24. The computer implemented method of claim 22 further comprising:
responsive to determining that the proximity of the individual to the vehicle or the mode of operation of the vehicle has changed, modifying by the processor device an intensity of the selected noise generated.

25. The computer implemented method of claim 21, wherein the mode of operation is the vehicle's intent to perform a particular task in the operating environment.

26. The computer implemented method of claim 21, wherein the sensor device detects a context identifier worn by the individual, and wherein the context identifier is a radio frequency identification tag that identifies the individual and a location of the individual in the operating environment of the vehicle.

27. The computer implemented method of claim 21, wherein the sensor device detects a body temperature of the individual to identify the individual and a location of the individual in the operating environment of the vehicle.

28. The computer implemented method of claim 21, wherein the operating environment is a structured work-site where only authorized workers are present.

29. The computer implemented method of claim 21, wherein the vehicle is one of an autonomous vehicle or a semi-autonomous vehicle used to perform tasks in the operating environment.

30. A computer implemented method in a noise management system for directing a vehicle to operate in a noise generating mode based on received signal data, the computer implemented method comprising:

receiving by a communications device communicatively coupled to the noise management system a signal that includes data when entering a noise generating zone in an area; and responsive to receiving the signal, operating by a processor device communicatively coupled to the noise management system the vehicle in a noise generating mode in the noise generating zone in accordance with the data included in the signal.

31. The computer implemented method of claim 30, wherein the data included in the signal includes at least one of a particular noise to generate by the vehicle in the noise generating zone, boundaries of the noise generating zone, and a vehicular speed limit within the noise generating zone.

32. The computer implemented method of claim 30, wherein the signal that includes the data is transmitted by a transmitter located at the beginning of the noise generating zone.

33. The computer implemented method of claim 32, wherein the transmitter includes a motion sensing device to detect an oncoming vehicle, and wherein the transmitter transmits the signal only when the oncoming vehicle is detected by the motion sensing device.

34. The computer implemented method of claim 31, wherein when individuals are identified as not being present in the noise generating zone via a sensor system the particular noise is not generated by the vehicle.

* * * * *